United States Patent
Yousef

(10) Patent No.: US 7,525,993 B2
(45) Date of Patent: Apr. 28, 2009

(54) ROBUST TRANSMISSION SYSTEM AND METHOD FOR MOBILE TELEVISION APPLICATIONS

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 362 days.

(21) Appl. No.: 11/440,388

(22) Filed: May 24, 2006

(65) Prior Publication Data

US 2007/0277209 A1 Nov. 29, 2007

(51) Int. Cl.
*H04J 3/24* (2006.01)
(52) U.S. Cl. .......................... 370/473; 725/62
(58) Field of Classification Search ................ 370/466, 370/469, 471, 473; 455/414.3; 714/776; 725/62
See application file for complete search history.

(56) References Cited

U.S. PATENT DOCUMENTS

| | | | |
|---|---|---|---|
| 2005/0089022 A1* | 4/2005 | Muhonen et al. ............ 370/352 |
| 2005/0090235 A1* | 4/2005 | Vermola et al. ........... 455/414.3 |
| 2005/0175099 A1* | 8/2005 | Sarkijarvi et al. ........ 375/240.16 |
| 2005/0232223 A1* | 10/2005 | Muller ......................... 370/350 |
| 2006/0092867 A1* | 5/2006 | Muller et al. ................. 370/312 |
| 2007/0153914 A1* | 7/2007 | Hannuksela et al. ... 375/240.26 |
| 2007/0186143 A1* | 8/2007 | Gubbi et al. ................. 714/776 |
| 2007/0277077 A1* | 11/2007 | Vesma et al. ................. 714/755 |
| 2007/0281757 A1* | 12/2007 | Iguchi et al. ................. 455/574 |

\* cited by examiner

*Primary Examiner*—Ricky Ngo
*Assistant Examiner*—Ben H Liu
(74) *Attorney, Agent, or Firm*—Rahman LLC

(57) ABSTRACT

A data transmission system and method for DVB-H signals for enhancing data robustness of a DVB-H receiver in additive white Gaussian noise (AWGN) channels includes transmitting IP datagrams from a DVB-H transmitter to the DVB-H receiver; applying a MPE section and a FEC section to the transmitted IP datagrams; mapping the transmitted IP datagrams to TS packets; aligning boundaries of the transmitted IP datagrams to a given number of TS packets; fixing a size of the IP datagrams to a known value at the DVB-H receiver; and extracting the IP datagrams from the DVB-H receiver.

28 Claims, 10 Drawing Sheets

ROBUST TRANSMISSION SYSTEM AND METHOD FOR MOBILE TELEVISION APPLICATIONS

BACKGROUND AND SUMMARY

The embodiments herein generally relate to mobile television (TV) technologies, and, more particularly, to transmission schemes for mobile TV digital video broadcasting (DVB) applications.

Handheld devices with integrated digital television access are a relatively new phenomenon. Such technology has traditionally been limited by size, power consumption, and most importantly performance. Poor performance of such devices has typically been the result of the constantly changing receiver environment. More particularly, the quality of the received signal is affected by the device's ability to manage adjacent-channel rejection, low signal-to-noise ratios, and Doppler compensation, among other factors.

DVB-H is the specification for bringing broadcast services to handheld receivers, and was formally adopted as an ETSI (European Telecommunications Standards Institute) standard in November 2004. More specifically, DVB-H is a terrestrial digital TV standard that tends to consume less power than its predecessor, the DVB-T standard, and generally allows the receiver to move freely while receiving the signal transmission, thereby making it ideal for cellular phones and other mobile devices to receive digital TV broadcasting over the digiTV network, and hence without having to use cellular telephone networks.

In mobile TV Digital Video Broadcasting—Handheld (DVB-H) systems such as DVB-H (ETSI EN 301 192), encoded video is broadcast over Internet Protocol (IP) packets. Encoded video bytes from a video decoder are mapped into variable length IP packets called IP datagrams. The IP datagrams are then mapped into sections where each datagram is pre-pended with a 12 byte section header and postpended with a 4 byte section Cyclic Redundancy Check (CRC). Sections are then mapped on fixed length MPEG-2 Transport Stream (TS) packets of length 188 byte each. Generally, each TS packet has a header of 4 or 5 bytes. This procedure is typically referred to as Multi Protocol Encapsulation (MPE) and is illustrated in FIG. 1.

In order to protect the IP datagrams, a Reed Solomon (RS) Forward Error Correction (FEC) code may be applied to the IP datagrams. This is illustrated in FIG. 2, where IP datagrams are arranged column-wise in a matrix and then RS coding is applied row-wise to obtain FEC sections. This operation is called MPE-FEC. The thick arrows in FIG. 2 represent the direction of filling the columns of the table. For example, the arrows indicate that data is written from top to bottom in the table. After MPE-FEC, the IP datagrams are encapsulated into TS packets as depicted in FIG. 1. The FEC columns are also encapsulated into TS packets by mapping each FEC row into a section and then mapping FEC sections into TS packets.

FIG. 3 shows the architecture of a DVB-H transmission system 300. Here, one may notice that MPE-FEC provides protection to the IP datagrams. However, it generally does not provide any protection to the section headers, section CRC, Program Specific Information/Service Information (PSI/SI) sections, and the identifiers of different TS packets of different DVB services that get multiplexed into one TS. Typically, each DVB service has a unique TS identifier that is sent in the header of its TS packets, called the Packet Identifier (PID).

FIG. 4 shows the architecture of a DVB-H receiver 400 that extracts IP datagrams for a desired channel from the DVB-T signal. The DVB-T signal is decoded using a demodulator 410 that extract TS packets. At a very low signal-to-noise ratio (SNR), the TS packets can contain several errors. In general, such errors could be corrected by the MPE-FEC RS decoder 414 that can correct up to 32 random byte errors out of each 256 bytes in every row of the MPE-FEC frame shown in FIG. 2. However, the errors in the TS can cause the three blocks 412a, 412b, 412c in FIG. 4 to completely fail, thereby generating many more errors than the MPE-FEC RS decoder 414 can correct.

For example, the following three scenarios can cause several catastrophic errors; for example: (1) Errors in the PID of TS packets can cause the TS demux PID filter 412a to drop packets of the desired channel. Furthermore, it could case undesired TS packets to be passed incorrectly. (2) Errors in the TS packet header can cause dropping complete or parts of the desired MPE and FEC sections. (3) Errors in the desired section header can result in complete sections to be dropped or could cause sections to be written to the wrong location in the MPE-FEC table shown in FIG. 2. (4) Errors in the TS packets can prohibit the receiver from extracting the PSI/SI sections correctly. Any of the above errors can cause the MPE-FEC operation to fail completely to correct the errors introduced in the TS due to channel noise. Upon error correction, the IP datagrams are transmitted to an IP demux 416, which then extracts the desired IP datagrams to an IP decapsulator 418, which then decapsulates the video (bytes) to a video decoder 420, which transmits the audio/video content. Accordingly, there remains a need for a technique to allow a DVB-H receiver to avoid such catastrophic errors.

In view of the foregoing, the embodiments herein provide a data transmission method for DVB-H signals for enhancing data robustness of a DVB-H receiver in additive white Gaussian noise (AWGN) channels, and a program storage device readable by computer, tangibly embodying a program of instructions executable by the computer to perform the method, wherein the method comprises transmitting IP datagrams from a DVB-H transmitter to the DVB-H receiver; applying a MPE section and a FEC section to the transmitted IP datagrams; mapping the transmitted IP datagrams to TS packets; aligning boundaries of the transmitted IP datagrams to a given number of TS packets; fixing a size of the IP datagrams to a known value at the DVB-H receiver; and extracting the IP datagrams from the DVB-H receiver.

Preferably, the extraction of the IP datagrams from the DVB-H receiver occurs absent information provided in MPE-FEC section headers and information provided in headers of the TS packets. Moreover, the IP datagrams and the FEC sections are preferably of fixed length. Additionally, the length of the IP datagrams is preferably fixed to the same length of the FEC sections. Furthermore, the size of the IP datagrams are preferably transmitted to the DVB-H receiver. Also, knowledge of the fixed length of the IP datagrams preferably allows the DVB-H receiver to deduce section start address of all IP datagram sections. Preferably, Delta-t information corresponding to the IP datagrams sections is derived by averaging different values of Delta-t sent over different MPE and FEC sections.

The method may further comprise selecting a fixed length of all IP datagrams to fit exactly a fixed integer number of the TS packets. Moreover, the method may further comprise grouping the TS packets into units of a predetermined number of packets (K), wherein each K packet group comprises a same PID. The method may further comprise repeating each PSI/SI TS packet K times approximately every programmable period of time. Preferably, the method further comprises filtering the TS packets based on a PID of K consecutive TS packets.

Another embodiment provides a system for data transmission for DVB-H signals for enhancing data robustness of a DVB-H receiver in AWGN channels, wherein the system comprises a DVB-H transmitter adapted to transmit IP datagrams to the DVB-H receiver; a decoder adapted to apply a MPE section and a FEC section to the transmitted IP datagrams; logic circuitry adapted to map the transmitted IP datagrams to TS packets; align boundaries of the transmitted IP datagrams to a given number of TS packets; and fix the size of the IP datagrams to a known value at the DVB-H receiver; and a modulator adapted to extract the IP datagrams from the DVB-H receiver.

Preferably, the extraction of the IP datagrams from the DVB-H receiver occurs absent information provided in MPE-FEC section headers and information provided in headers of the TS packets. Moreover, the IP datagrams and the FEC sections are preferably of fixed length. Furthermore, the length of the IP datagrams is preferably fixed to the same length of the FEC sections. Preferably, the size of the IP datagrams are transmitted to the DVB-H receiver. Additionally, the DVB-H receiver may comprise a PID filter adapted to filter the TS packets based on the PID of a predetermined number (K) of consecutive TS packets.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
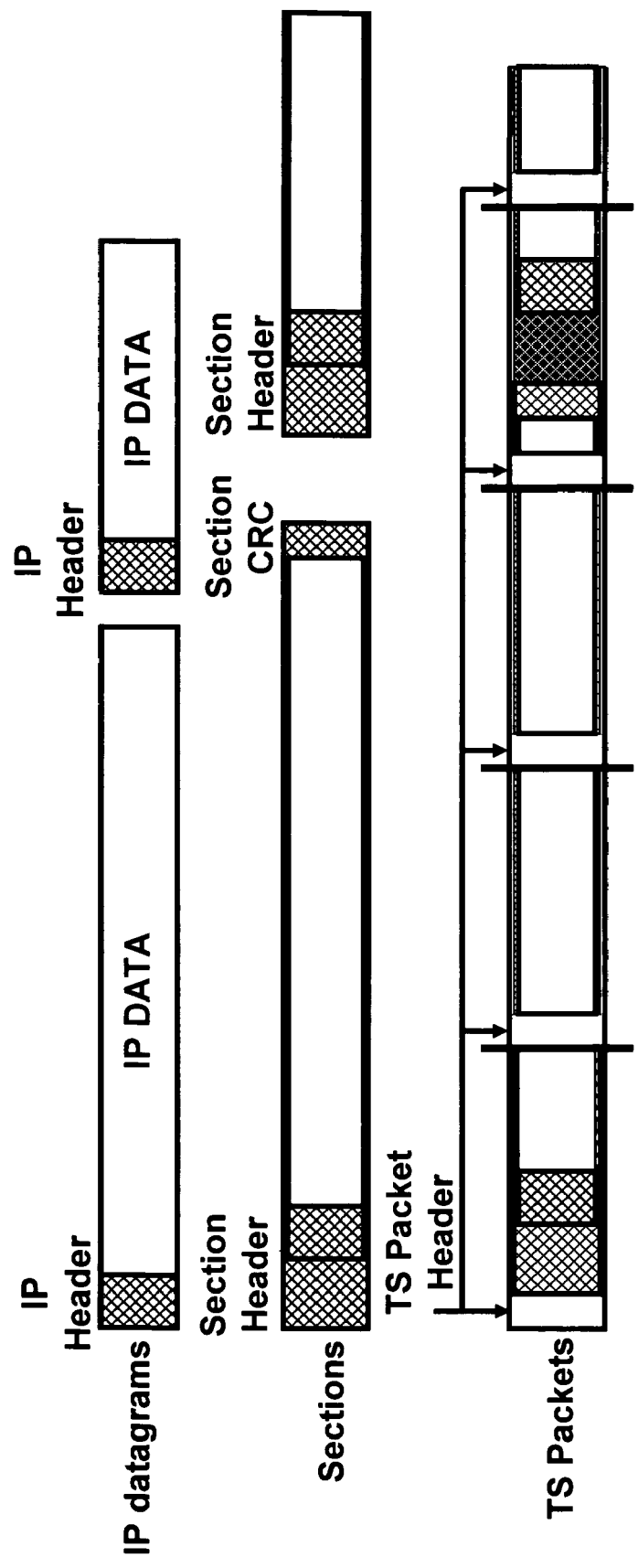
FIG. 1 illustrates a schematic diagram of a MPE procedure.
Figure 2:
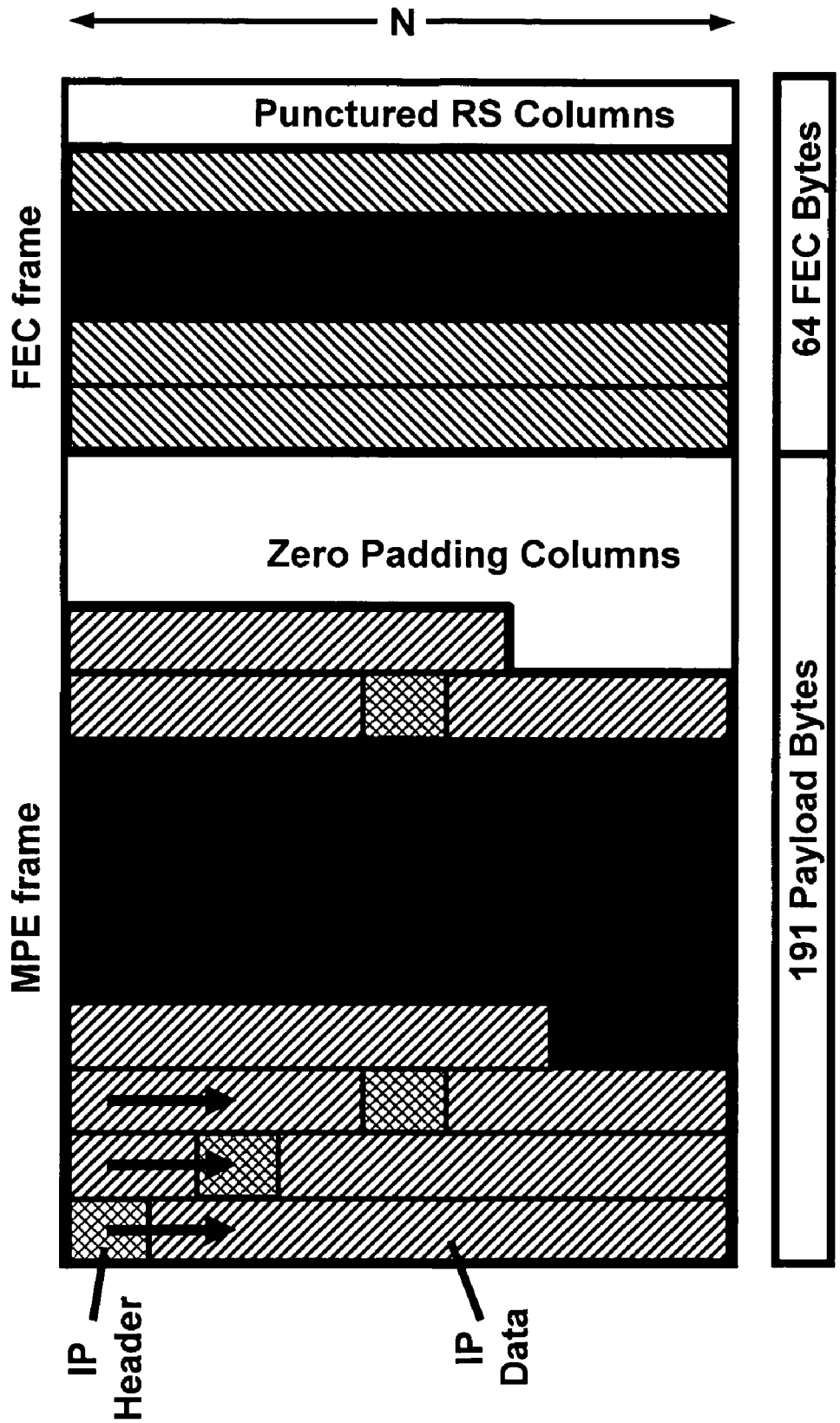
FIG. 2 illustrates a schematic diagram of a MPE-FEC RS coding process.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a technique to allow a DVB-H receiver to avoid the catastrophic errors described above. The embodiments herein achieve this by providing a robust transmission scheme that enables the DVB-H receiver 400 (of FIG. 4) to avoid such catastrophic errors that could occur in extracting IP datagrams and FEC sections from TS packets that contain errors. Referring now to the drawings, and more particularly to FIGS. 1 through 10, where similar reference characters denote corresponding features consistently throughout the figures, there are shown preferred embodiments.

Figure 5:
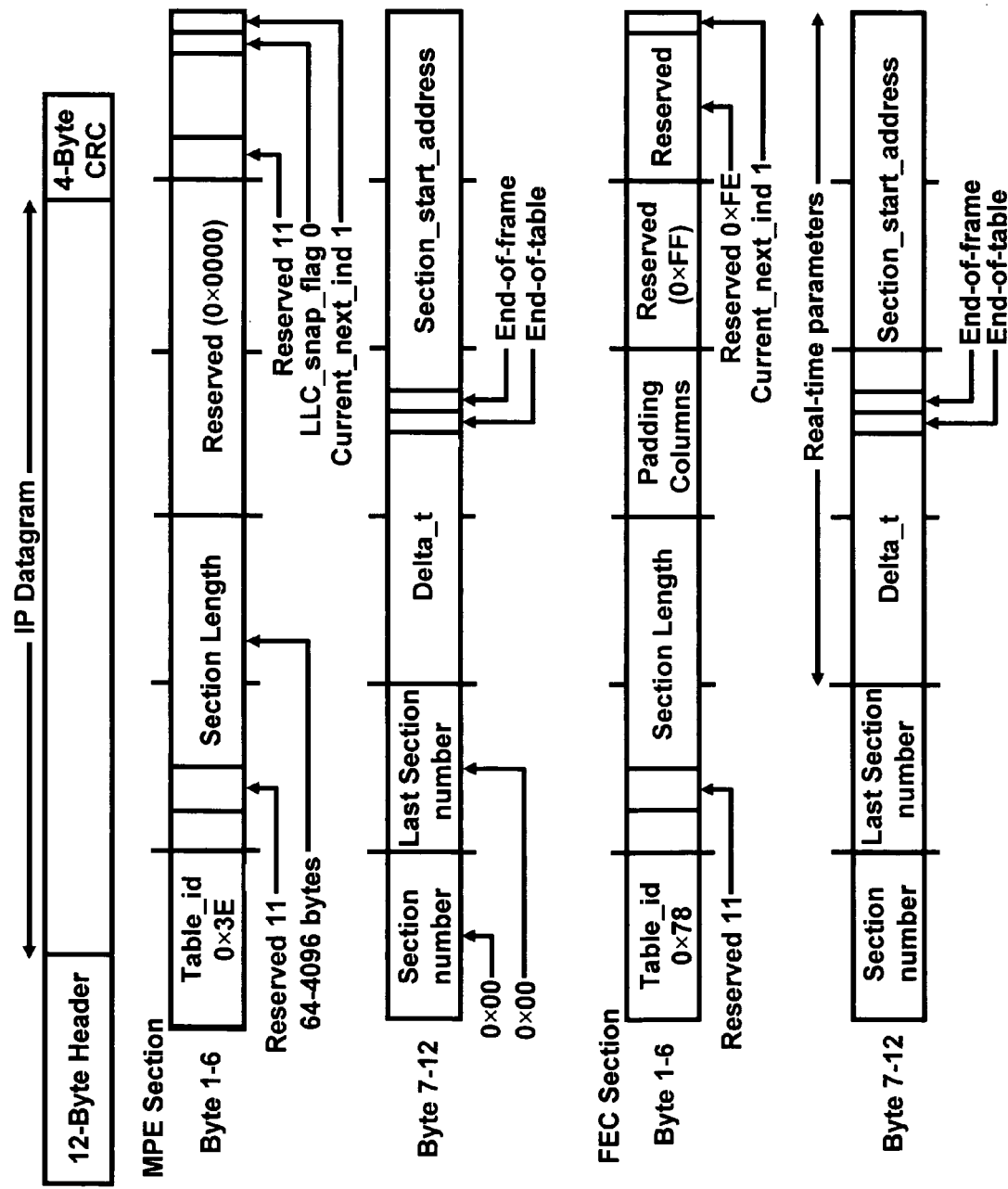
FIG. 5 illustrates a schematic diagram of a MPE and FEC section header format.
Figure 7:
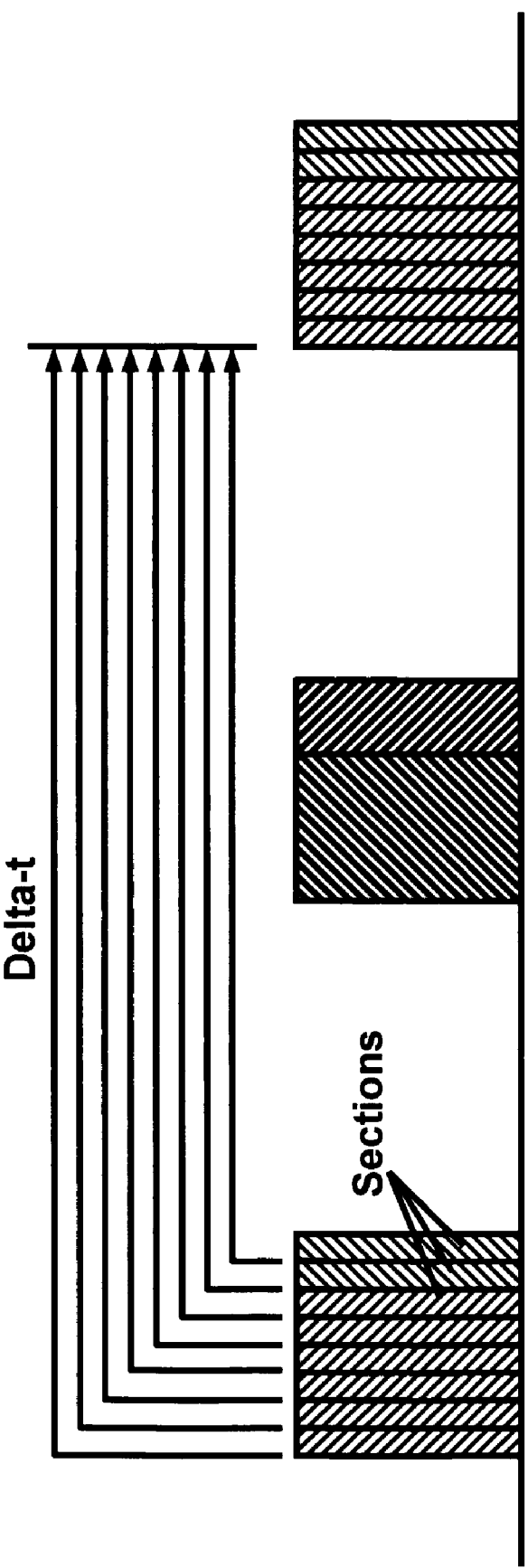
FIG. 7 illustrates a schematic diagram of a Delta-t signaling representation.

The robust transmission scheme provided by the embodiments herein is completely backward compatible with the DVB-H specification. In other words, a legacy receiver (such as the receiver 400 shown in FIG. 4) that complies with the DVB-H specification should not suffer any degradation in performance but will still suffer of the problems in the previous section. On the other hand, a receiver (such as the receiver 400 shown in FIG. 4) that is aware of the robust transmission scheme afforded b the embodiments herein can exploit this information to avoid the catastrophic error scenarios thereby achieving significantly better performance in additive white Gaussian noise (AWGN) channels. The embodiments herein allow the DVB-H transmitter 300 (of FIG. 3) to select certain parameters to be fixed in order to allow the DVB-H receiver 400 (of FIG. 4) to extract IP datagrams without the need for:

(a) Information in the MPE and FEC section headers. The MPE section header contains the length of the MPE section, the MPE section start address in the MPE-FEC table. The FEC section header contains the FEC section length, the number of padding FEC columns, and end-of-frame information as indicated in FIG. 5. Furthermore, both MPE and FEC section headers contain timing information of the next burst of the desired service (Delta-t in FIG. 7). In FIG. 7, "Sections" refer to MPE sections (IP datagrams) or FEC sections. The Delta-t information is the time period between the current time instant and the next burst event. Delta-t is information that is contained in the MPE and FEC headers that are not protected by the RS code. Accordingly, the embodiments herein provide a method to avoid error events in Delta-t information.

Figure 6:
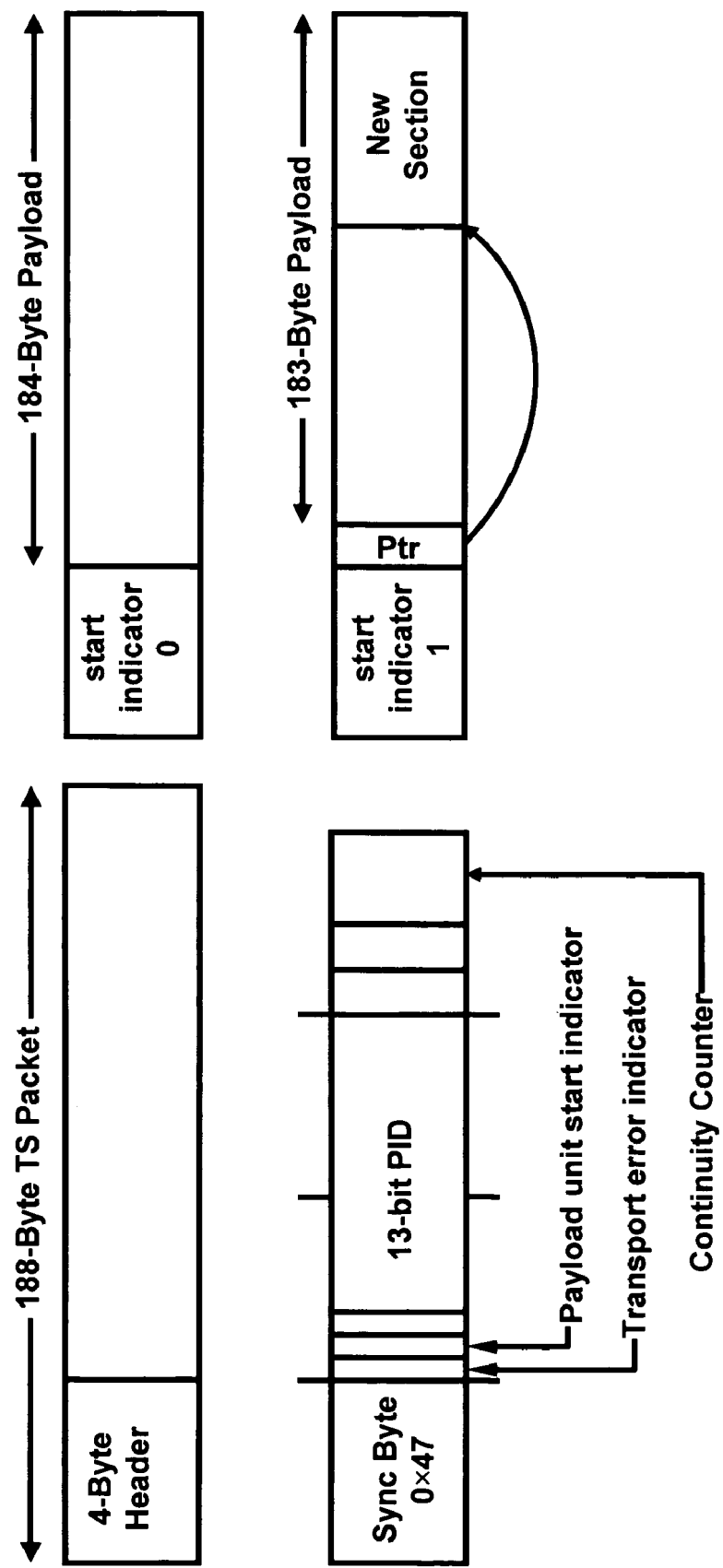
FIG. 6 illustrates a schematic diagram of a TS header format.

(b) Information in the TS packet headers, as shown in FIG. 6, signals if a new section starts in the current TS packet, a pointer to the start of the new section, and PID that identifies to which DVB service the TS packet belongs to.

Figure 3:
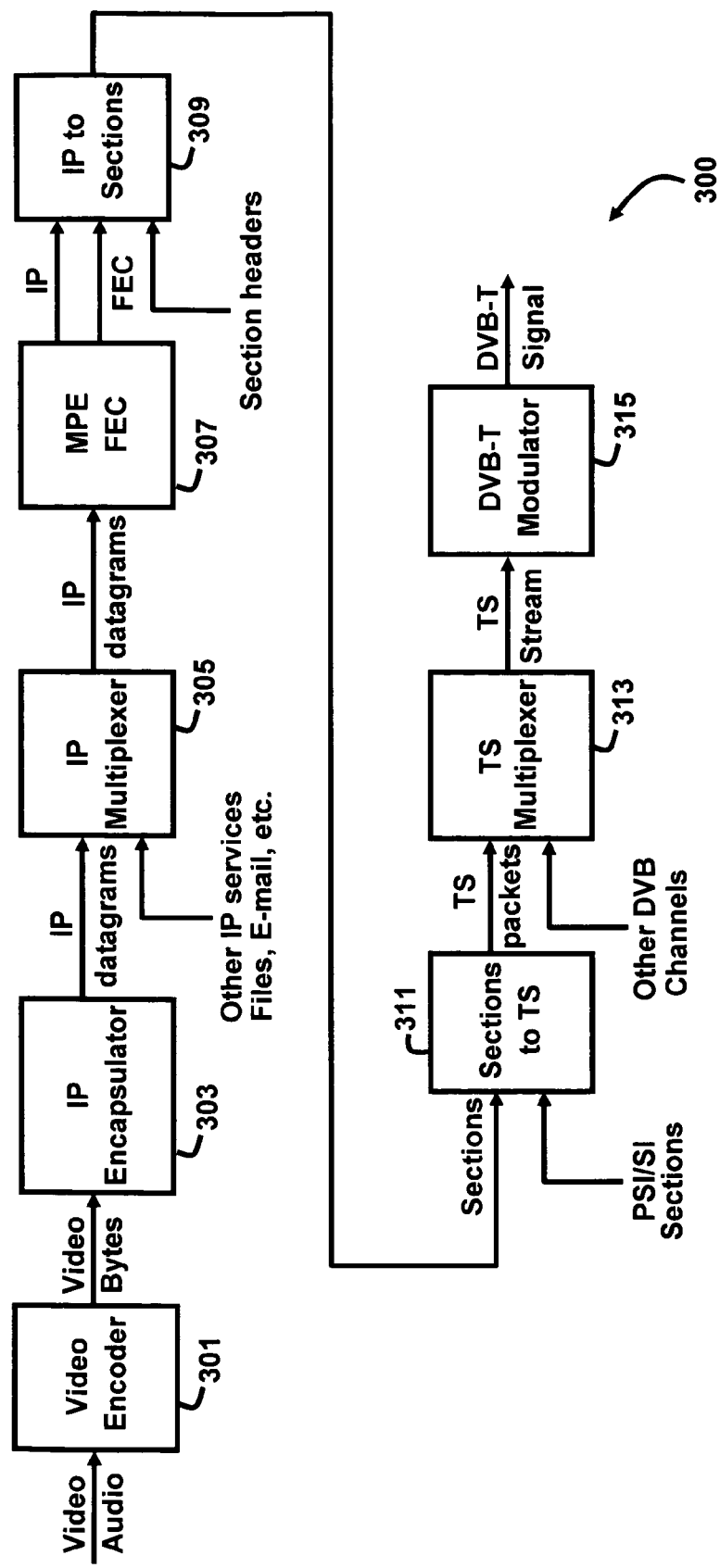
FIG. 3 illustrates a schematic diagram of a DVB-H transmitter architecture.

Again, FIG. 3 shows a DVB-H transmitter 300. Video and audio signals are encoded using a video encoder 301 to video bytes. The IP encapsulator 303 encapsulates the video bytes into IP datagrams. The IP multiplexer 305 combines IP datagrams with other IP services such as e-mail or data files to form one IP datagram stream. The MPE FEC block 307 adds protection parity (FEC) bytes to the original IP datagrams. The IP datagrams and FEC bytes are converted to DVB sections by adding section headers to each of them at block 309. The resulting sections are combined with other DVB sections such as PSI/SI sections to for TS packets at block 311. The TS is combined with other DVB channels using a TS multiplexer 313 into a single TS. The combined TS are finally modulated using DVB-T modulator 315.

Figure 4:
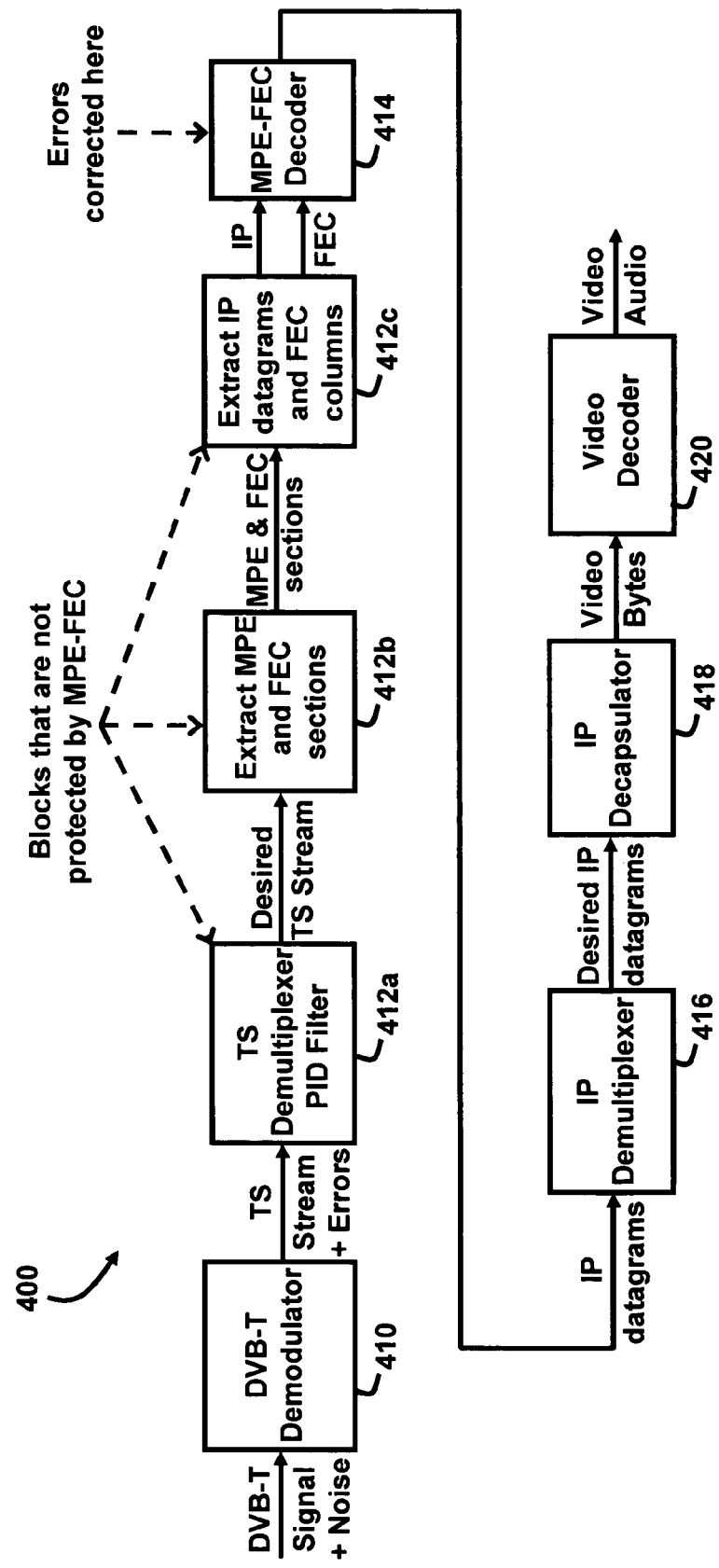
FIG. 4 illustrates a schematic diagram of a DVB-H receiver architecture.

Again, FIG. 4 shows the block diagram of a DVB-H receiver 400. The modulated DVB-T signal is received over a noisy channel. A DVB-T demodulator 410 decodes the signal to generate a TS. This could contain errors due to the noisy nature of the channel. A TS demultiplexer PID filter 412a is used to filter out undesired DVB channels and services. MPE and FEC sections are extracted from the desired TS at block 412b. IP datagrams and FEC columns are extracted at block 412c. The IP datagrams and FEC columns are fed to an MPE-FEC decoder 414 that can correct errors in the transmission. Blocks 412a, 412b, and 412c and the operations performed in each of them are not protected against errors as they happen before the MPE-FEC decoder 414. Desired IP datagrams are extracted by the IP demultiplexer 416, video bytes are extracted using the IP decapsulator 418, and finally the video decoder 420 decodes the desired video/audio signals.

The embodiments herein preferably utilize fixed length IP datagrams and fixed length MPE sections. The transmitter 300 (of FIG. 3) chooses to use fixed length IP datagrams for one or all DVB-H services (say, for example, L bytes). The fixed length of the IP datagram causes the length of MPE sections to be fixed as well. Moreover, the length of the IP datagrams could be fixed to the same length of the FEC sections. Furthermore, the length of the IP datagrams could either be conveyed to the receiver 400 (of FIG. 4) in a special message (i.e., the length of the IP datagrams could be conveyed to the receiver 400 with other protected system information) or could be decoded by the receiver 400 by averaging the length field in several received sections. Once the section length becomes fixed, it will repeat in every datagram.

Knowing the fixed MPE section length, the receiver 400 can now deduce the section start address of all sections without decoding it as it now becomes 0, L, 2L, . . . Exploiting the fact that the transmitter 300 (of FIG. 3) also fixes the length of the FEC sections (according to the DVB-H specification). The length of the FEC sections can be deduced from the system tables (not shown). Also, the section start address for the FEC sections can also be deduced knowing the length of the FEC sections.

The Delta-t information can be derived by averaging the different values of Delta-t sent over the different MPE and FEC sections. The end-of-frame condition can be forced if no sections were received for a certain period of time. Accordingly, if the transmission technique provided by the embodiments herein is used, the receiver 400 (of FIG. 4) does not need to decode the section headers. Thus, errors in these headers in noisy channel conditions would not lead to receiver failure.

Preferably, the embodiments select the fixed length of all IP datagrams to fit exactly a fixed integer number of TS packets. Such a selection causes an IP datagram section to fit in a fixed integer number of TS packets (say, for example, K packets). This always causes the section pointer to have the value of '0x00' for all sections. The receiver 400 can now detect the start of a new section every K TS packets. In this regard, the receiver 400 only has to detect the beginning of the first section in a given burst and then count K packets to get the next section. The PID filtering 412a (of FIG. 4) can now be performed on K PID values and not just one. This reduces the probability of missing desired packets or sections.

Preferably, the technique provided by the embodiments herein group the TS packets into units of K packets with each K packet group having the same PID. When the transmitter 300 multiplexes multiple DVB services (i.e., audio, video, data, e-mail, system information, etc.) all with different PID values, it will group each service in groups of K packets. If a service such as a PSI/SI table does not have enough packets to fill K packets, the transmitter 300 will group more than one service to form a group of K packets or the transmitter 300 can append a certain number of packets which is less than K with null packets to keep the K TS packet grouping valid. This enables the receiver 400 (of FIG. 4) to perform robust PID filtering by buffering every K packets and comparing all K PID values of K packets together with a threshold to determine whether the PID is the desired PID.

Preferably, each PSI/SI TS packet is repeated K times every few seconds (for example, approximately every 100 ms). The transmitter 300 (of FIG. 3) repeats every PSI/SI TS packet K times to provide protection against errors. In order to avoid large overhead (i.e., sending redundant information or wasting channel capacity), this repetition could be performed only every few seconds (for example, approximately every 100 ms). Preferably, the PSI/SI packets are retransmitted every 100 ms. The receiver 400 (of FIG. 4) tries to get the normal transmission that is sent every 100 ms. If it cannot, the receiver 400 waits until the repeated transmission is available and decodes the PSI/SI information.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The software embodiments include, but is not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
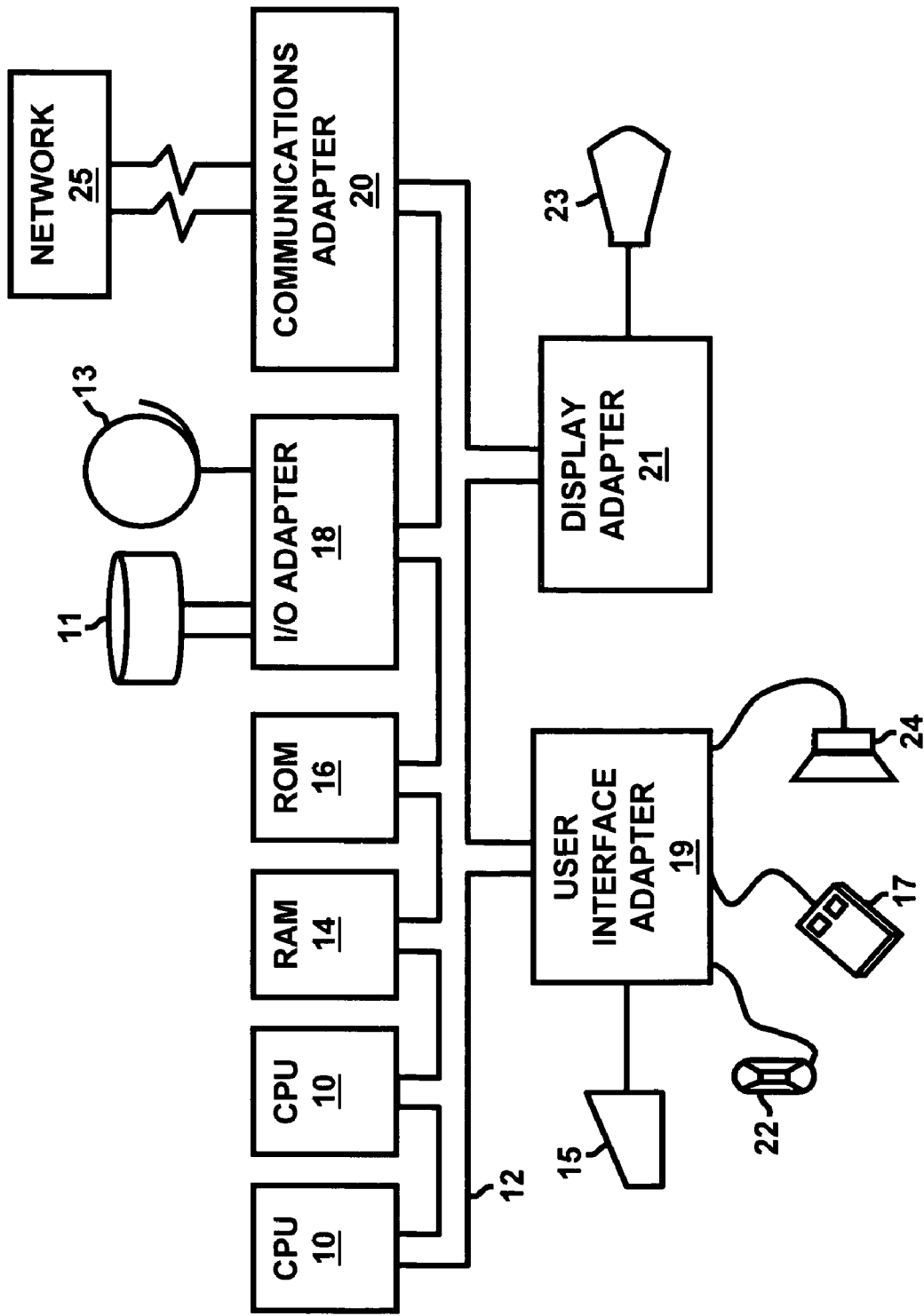
FIG. 8 illustrates a schematic diagram of a computer system according to an embodiment herein.

A representative hardware environment for practicing the embodiments herein is depicted in FIG. 8. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a RAM 14, ROM 16, and an I/O adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 9:
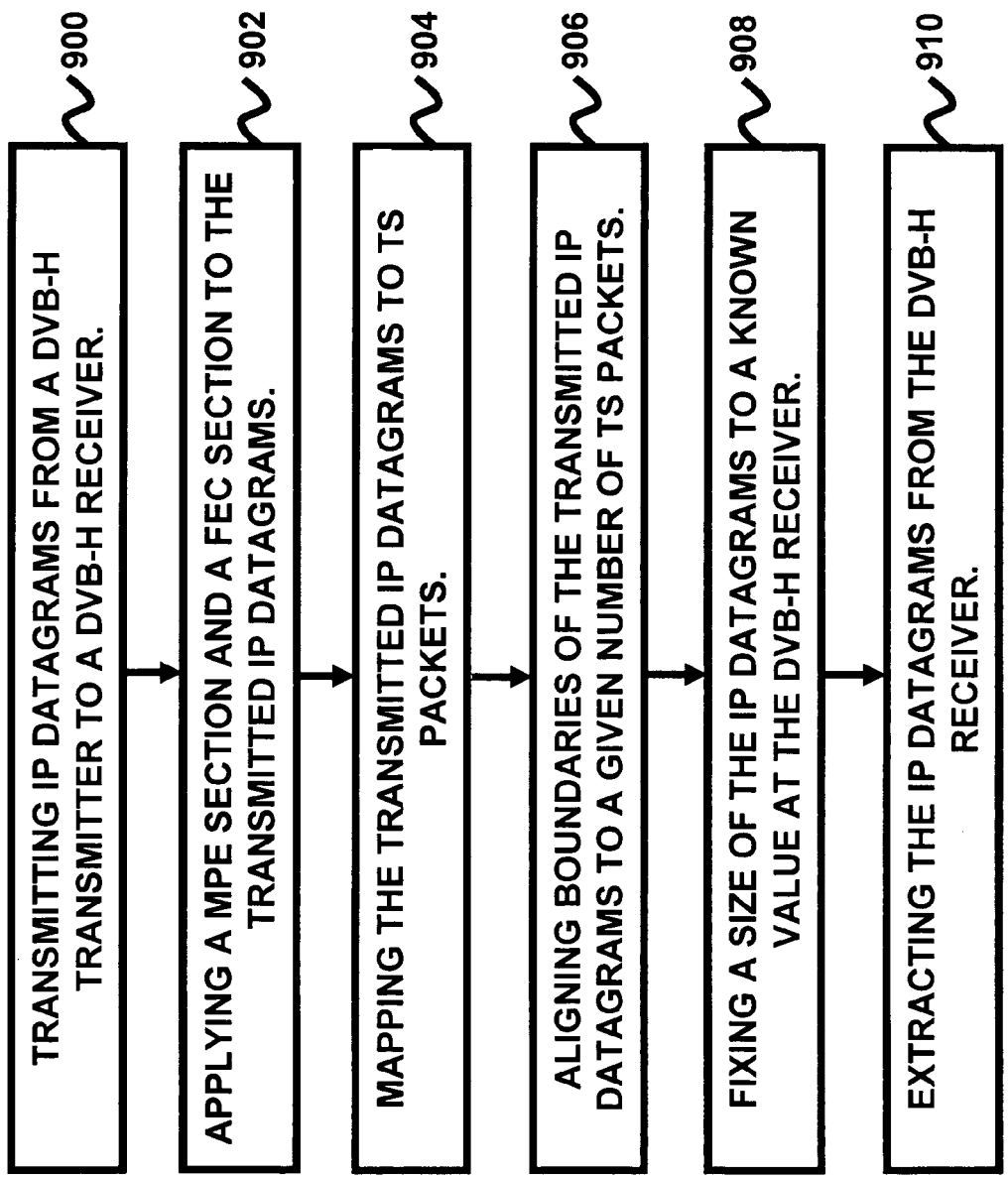
FIG. 9 is a flow diagram illustrating a preferred method according to an embodiment herein.

FIG. 9, with reference to FIGS. 1 through 8, is a flow diagram illustrating a data transmission method for DVB-H signals for enhancing data robustness of a DVB-H receiver 400 in AWGN channels according to an embodiment herein, wherein the method comprises transmitting (900) IP datagrams from a DVB-H transmitter 300 to the DVB-H receiver 400; applying (902) a MPE section and a FEC section to the transmitted IP datagrams; mapping (904) the transmitted IP datagrams to TS packets; aligning (906) boundaries of the transmitted IP datagrams to a given number of TS packets; fixing (908) a size of the IP datagrams to a known value at the DVB-H receiver 400; and extracting (910) the IP datagrams from the DVB-H receiver 400.

Preferably, the extraction of the IP datagrams from the DVB-H receiver 400 occurs absent information provided in MPE-FEC section headers and information provided in headers of the TS packets. Moreover, the IP datagrams and the FEC sections are preferably of fixed length. Additionally, the length of the IP datagrams is preferably fixed to the same length of the FEC sections. Furthermore, the size of the IP datagrams are preferably transmitted to the DVB-H receiver 400. Also, knowledge of the fixed length of the IP datagrams preferably allows the DVB-H receiver 400 to deduce section start address of all IP datagram sections. Preferably, Delta-t information corresponding to the IP datagrams sections is derived by averaging different values of Delta-t sent over different MPE and FEC sections.

The method may further comprise selecting a fixed length of all IP datagrams to fit exactly a fixed integer number of the TS packets. Moreover, the method may further comprise grouping the TS packets into units of a predetermined number of packets (K), wherein each K packet group comprises a same PID. The method may further comprise repeating each PSI/SI TS packet K times approximately every programmable period of time. Preferably, the method further comprises filtering the TS packets based on a PID of K consecutive TS packets.

Figure 10:
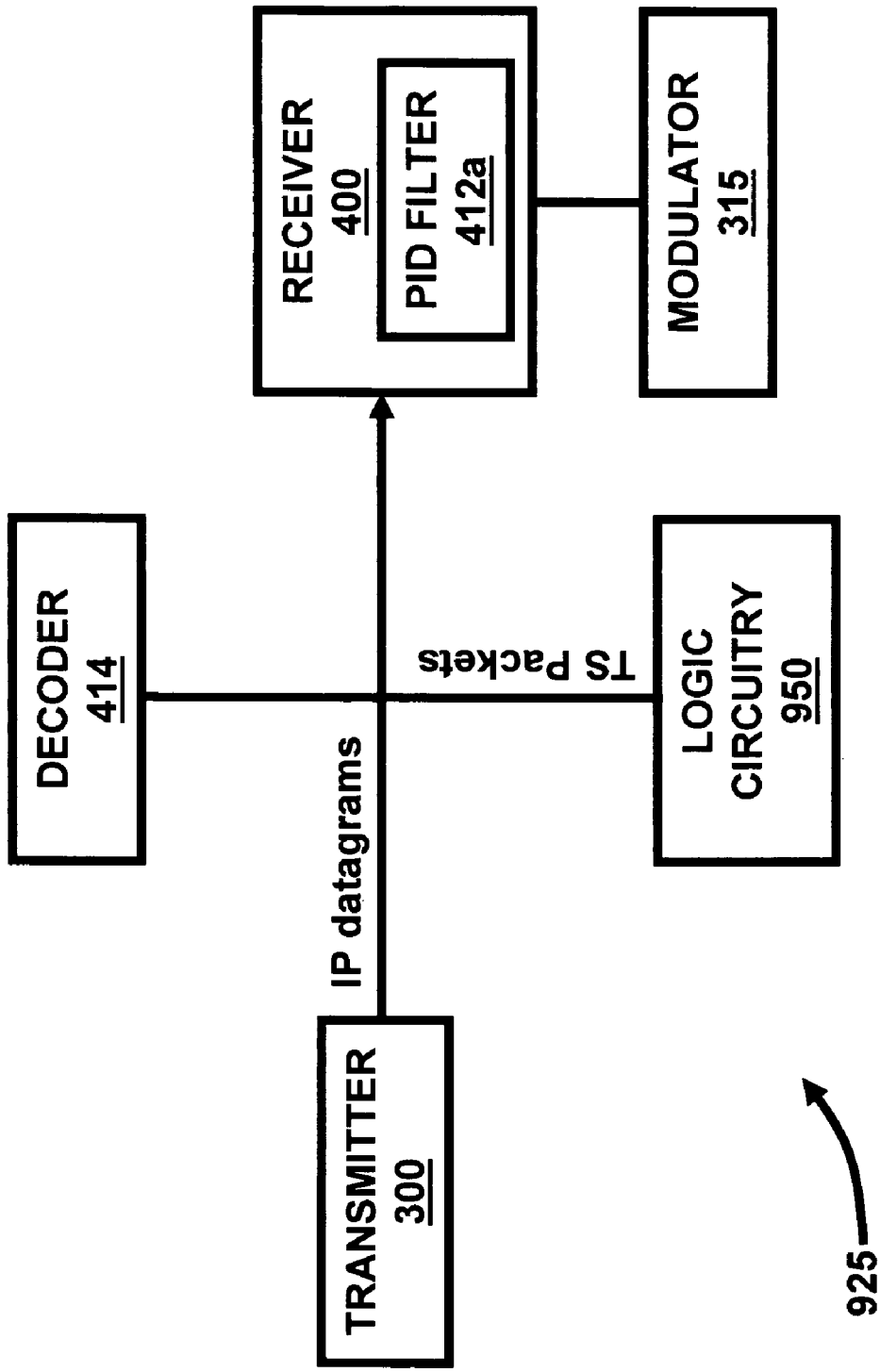
FIG. 10 illustrates a schematic diagram of a system according to an embodiment herein.

FIG. 10 illustrates a system 925 for data transmission for DVB-H signals for enhancing data robustness of a DVB-H receiver 400 in AWGN channels according to an embodiment herein, wherein the system 925 comprises a DVB-H transmitter 300 adapted to transmit IP datagrams to the DVB-H receiver 400; a decoder 414 adapted to apply a MPE section and a FEC section to the transmitted IP datagrams; and logic circuitry 950 adapted to map the transmitted IP datagrams to TS packets; align boundaries of the transmitted IP datagrams to a given number of TS packets; and fix the size of the IP datagrams to a known value at the DVB-H receiver. The system 925 also includes a modulator 315 adapted to extract the IP datagrams from the DVB-H receiver 400. Additionally, the DVB-H receiver 400 may comprise a PID filter 412*a* adapted to filter the TS packets based on the PID of a predetermined number (K) of consecutive TS packets.

The embodiments herein provide a transmission scheme for DVB-H signals that significantly enhances the robustness of DVB-H receivers in AWGN channels. The transmission scheme relies on aligning the boundaries of transmitted IP packets to a given number of TS packets as well as fixing the size of the IP packets to a known value at the receiver. This provides great robustness to random errors. The technique is fully backward compatible with the DVB-H specification and does not need any modification to the specification.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A data transmission method for Digital Video Broadcasting-Handheld (DVB-H) signals for enhancing data robustness of a DVB-H receiver in additive white Gaussian noise (AWGN) channels, said method comprising:

transmitting Internet Protocol (IP) datagrams from a DVB-H transmitter to said DVB-H receiver;

applying a Multi Protocol Encapsulation (MPE) section and a Forward Error Correction (FEC) section to the transmitted IP datagrams;

mapping said transmitted IP datagrams to Transport Stream (TS) packets;

aligning boundaries of said transmitted IP datagrams to a given number of TS packets;

fixing a size of said IP datagrams to a known value at said DVB-H receiver; and extracting said IP datagrams from said DVB-H receiver.

2. The method of claim 1, wherein the extraction of said IP datagrams from said DVB-H receiver occurs absent information provided in MPE-FEC section headers and information provided in headers of said TS packets.

3. The method of claim 2, wherein said IP datagrams and the FEC sections are of fixed length.

4. The method of claim 2, wherein the length of said IP datagrams is fixed to the same length of the FEC sections.

5. The method of claim 2, wherein the size of said IP datagrams are transmitted to said DVB-H receiver.

6. The method of claim 2, wherein knowledge of the fixed length of said IP datagrams allows said DVB-H receiver to deduce section start address of all IP datagram sections.

7. The method of claim 1, wherein Delta-t information corresponding to said IP datagrams sections is derived by averaging different values of Delta-t sent over different MPE and FEC sections.

8. The method of claim 1, further comprising selecting a fixed length of all IP datagrams to fit exactly a fixed integer number of said TS packets.

9. The method of claim 1, further comprising grouping said TS packets into units of a predetermined number of packets (K), wherein each K packet group comprises a same Packet Identifier (PID).

10. The method of claim 9, further comprising repeating each Program Specific Information/Service Information (PSI/SI) TS packet K times approximately every programmable period of time.

11. The method of claim 9, further comprising filtering said TS packets based on said PID of K consecutive TS packets.

12. A program storage device readable by computer, tangibly embodying a program of instructions executable by said computer to perform a data transmission method for Digital Video Broadcasting-Handheld (DVB-H) signals for enhancing data robustness of a DVB-H receiver in additive white Gaussian noise (AWGN) channels, said method comprising:

transmitting Internet Protocol (IP) datagrams from a DVB-H transmitter to said DVB-H receiver;

applying a Multi Protocol Encapsulation (MPE) section and a Forward Error Coffection (FEC) section to the transmitted IP datagrams;

mapping said transmitted IP datagrams to Transport Stream (TS) packets;

aligning boundaries of said transmitted IP datagrams to a given number of TS packets;

fixing a size of said IP datagrams to a known value at said DVB-H receiver; and extracting said IP datagrams from said DVB-H receiver.

13. The program storage device of claim 12, wherein the extraction of said IP datagrams from said DVB-H receiver occurs absent information provided in MPE-FEC section headers and information provided in headers of said TS packets.

14. The program storage device of claim 13, wherein said IP datagrams and the FEC sections are of fixed length.

15. The program storage device of claim 13, wherein the length of said IP datagrams is fixed to the same length of the FEC sections.

16. The program storage device of claim 13, wherein the size of said IP datagrams are transmitted to said DVB-H receiver.

17. The program storage device of claim 13, wherein knowledge of the fixed length of said IP datagrams allows said DVB-H receiver to deduce section start address of all IP datagram sections.

18. The program storage device of claim 12, wherein Delta-t information corresponding to said IP datagrams sections is derived by averaging different values of Delta-t sent over different MPE and FEC sections.

19. The program storage device of claim 12, wherein said method further comprises selecting a fixed length of all IP datagrams to fit exactly a fixed integer number of said TS packets.

20. The program storage device of claim 12, wherein said method further comprises grouping said TS packets into units of a predetermined number of packets (K), wherein each K packet group comprises a same Packet Identifier (PID).

21. The program storage device of claim 20, wherein said method further comprises repeating each Program Specific Information/Service Information (PSI/SI) TS packet K times approximately every programmable period of time.

22. The program storage device of claim 20, wherein said method further comprises filtering said TS packets based on said PID of K consecutive TS packets.

23. A system for data transmission for Digital Video Broadcasting-Handheld (DVB-H) signals for enhancing data robustness of a DVB-H receiver in additive white Gaussian noise (AWGN) channels, said system comprising:

a DVB-H transmitter adapted to transmit Internet Protocol (IP) datagrams to said DVB-H receiver;

a decoder adapted to apply a Multi Protocol Encapsulation (MPE) section and a Forward Error Correction (FEC) section to the transmitted IP datagrams;

logic circuitry adapted to:
map said transmitted IP datagrams to Transport Stream (TS) packets;
align boundaries of said transmitted IP datagrams to a given number of TS packets; and
fix the size of said IP datagrams to a known value at said DVB-H receiver; and a modulator adapted to extract said IP datagrams from said DVB-H receiver.

24. The system of claim 23, wherein the extraction of said IP datagrams from said DVB-H receiver occurs absent information provided in MPE-FEC section headers and information provided in headers of said TS packets.

25. The system of claim 24, wherein said IP datagrams and the FEC sections are of fixed length.

26. The system of claim 24, wherein the length of said IP datagrams is fixed to the same length of the FEC sections.

27. The system of claim 24, wherein the size of said IP datagrams are transmitted to said DVB-H receiver.

28. The system of claim 23, wherein said DVB-H receiver comprises a Packet Identifier (PID) filter adapted to filter said TS packets based on the PID of a predetermined number (K) of consecutive TS packets.

* * * * *